(No Model.) 2 Sheets—Sheet 1.
J. S. JENSEN.
SUCTION PUMP FOR COW MILKING MACHINES.
No. 529,865. Patented Nov. 27, 1894.
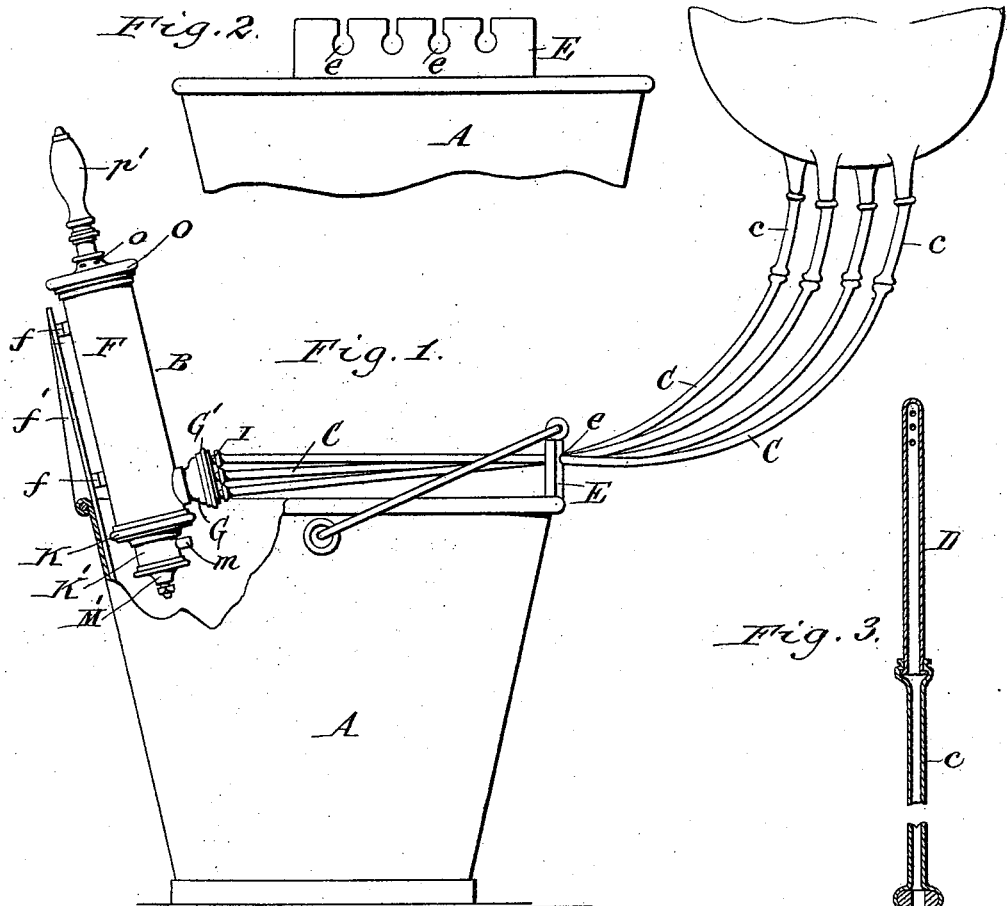
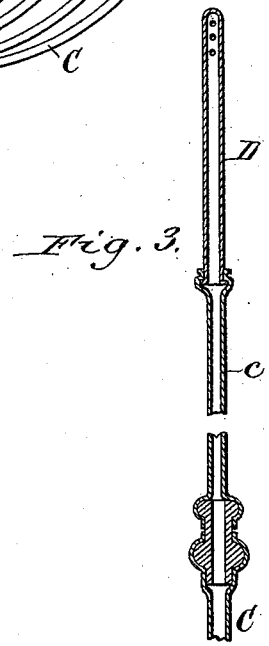
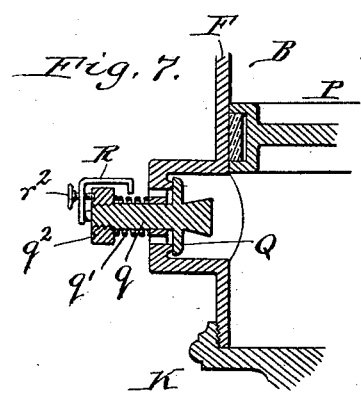
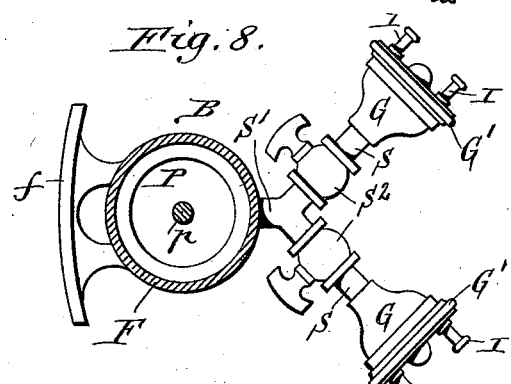
Witnesses: Emil Neuhart, Theo. L. Popp.
Jens Severin Jensen, Inventor.
By Wilhelm Bonner, Attorneys.

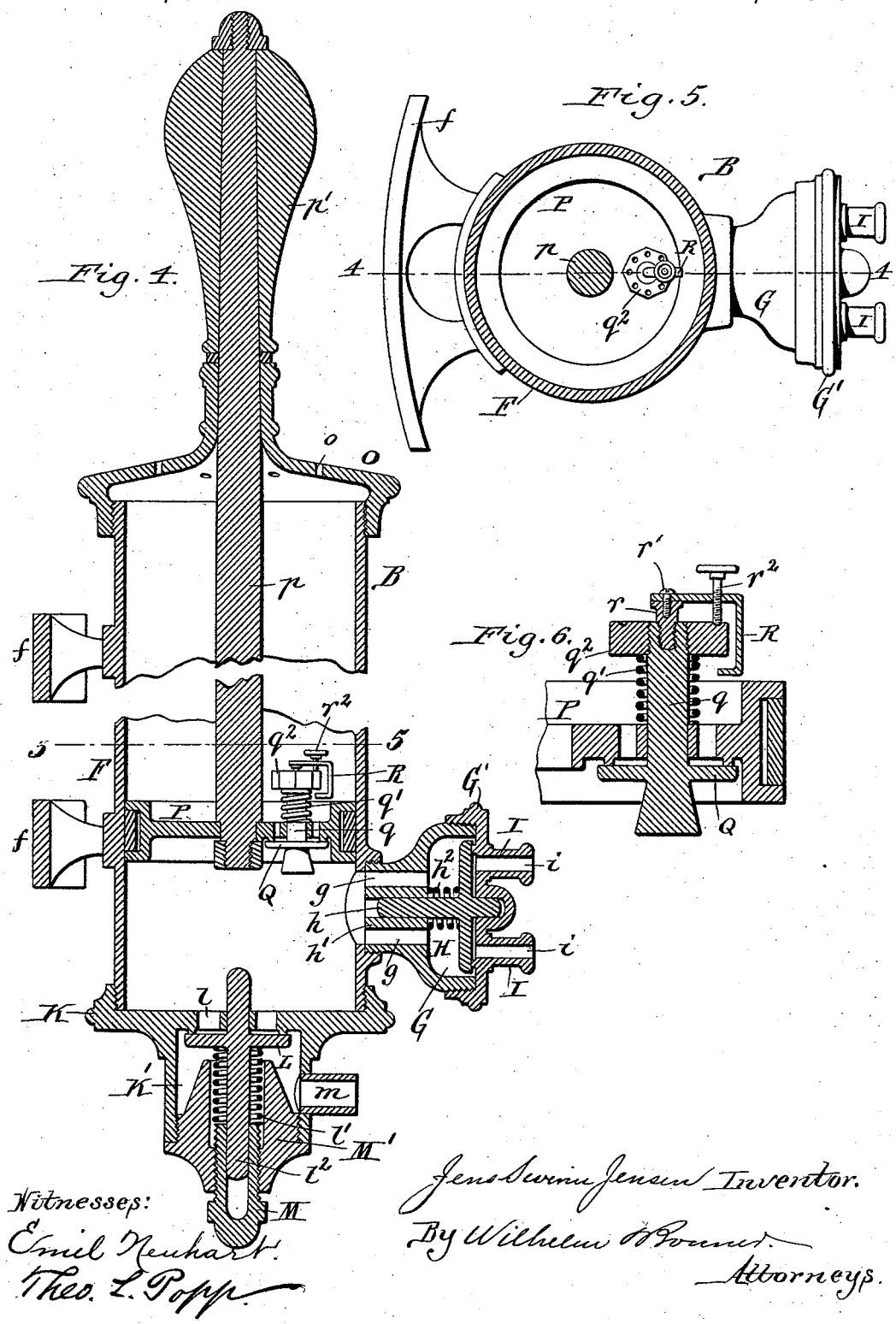

UNITED STATES PATENT OFFICE.

JENS SEVERIN JENSEN, OF THISTED, DENMARK, ASSIGNOR TO JOHAN D. FREDERIKSEN, OF LITTLE FALLS, NEW YORK.

SUCTION-PUMP FOR COW-MILKING MACHINES.

SPECIFICATION forming part of Letters Patent No. 529,865, dated November 27, 1894.

Application filed January 26, 1893. Serial No. 459,848. (No model.)

*To all whom it may concern:*

Be it known that I, JENS SEVERIN JENSEN, a subject of the King of Denmark, residing at Thisted, in the Kingdom of Denmark, have invented a new and useful Improvement in Suction-Pumps for Cow-Milking Machines, of which the following is a specification.

This invention relates to that class of milking machines which consist of a single-acting suction pump having its induction chamber connected by flexible pipes with the devices which are applied to the teats of the cow, so that the reciprocating movement of the pump causes an intermittent suction on said tubes.

The principal object of this invention is to regulate the partial vacuum which is produced by the pump and to prevent an excessive suction which would be liable to injure the cow.

In the accompanying drawings consisting of two sheets:—Figure 1 is an elevation of my improved cow-milking machine, showing the milk pail partly broken away and in section. Fig. 2 is an elevation, at right angles to Fig. 1, of the notched plate secured to the rim of the milk pail for holding the flexible tubes. Fig. 3 is a longitudinal section of one of the hollow needles or teat tubes. Fig. 4 is a sectional elevation of the pump, the section being taken in line 4—4, Fig. 5. Fig. 5 is a horizontal section in line 5—5, Fig. 4. Fig. 6 is an enlarged sectional view of the relief valve and its stop devices. Fig. 7 is a sectional view of the lower part of the pump, showing the relief valve applied to the lower part of the pump cylinder. Fig. 8 is a horizontal section, similar to Fig. 5, showing the pump provided with two induction chambers.

Like letters of reference refer to like parts in the several figures.

A represents the milk pail which is open at the top and may be of any ordinary construction.

B represents the suction pump which is preferably attached to the milk pail by releasable fastenings so that it can be readily applied and removed.

C represents the flexible tubes which connect the induction chamber of the pump with the devices which are applied to the teats of the cow for drawing the milk therefrom. As represented in Figs. 1 and 3 of the drawings, these devices consist of hollow needles or slender tubes D, which are provided with fine perforations near their closed ends, while their open ends connect by small flexible tubes $c$, with the larger flexible tubes C. These teat tubes D are inserted into the teat canals which can be readily done without injuring the membrane, by drawing the teat down by the hand, squeezing out the milk, and inserting the tube before releasing the teat. I prefer to use fine perforations instead of longitudinal slots in the tubes for the reason that the membrane is less liable to be drawn into the perforations. I prefer these devices for connecting the tubes to the teats but I do not wish to limit myself to the same, as other well known or suitable devices may be used for the purpose.

E represents a supporting plate secured to the rim of the milk pail, and provided in its top edge with downwardly enlarged notches $e$, in which the flexible tubes C are each separately supported.

F represents the pump cylinder which is arranged in an approximately upright position and provided on one side with lugs $f$, which are detachably secured to a standard $f'$, supported on the rim of the milk pail. The pump is arranged on one side of the pail and the notched plate on the other so that the flexible tubes extend from the pump across the top of the pail and through the notches of the plate.

G represents the induction chamber of the pump, arranged on one side of the pump cylinder near the lower end thereof, and communicating with the pump cylinder by the induction passage $g$.

H represents the induction valve arranged in the induction chamber G, and having its stem $h$, arranged in a bridge $h'$, formed centrally in the induction chamber.

$h^2$ represents a spring which is applied to the induction valve and holds the latter to its seat. This seat is formed in the cap G', attached to the induction chamber and provided within the valve seat with four inlet passages $i$, formed in nipples I, projecting outwardly from the cap G'. The flexible tubes $c$ are attached to these nipples.

K represents the lower head of the pump cylinder, and K' represents the eduction chamber formed on the lower side of said head. This chamber contains the eduction valve L, which closes against the under side of a valve seat formed around the eduction passage $l$, in the head K. The eduction valve L is held against its seat by a spring $l'$, which surrounds the stem $l^2$ of the valve. The latter is guided in a cap M screwed into a plug M' which closes the lower end of the eduction chamber.

$m$ represents the discharge tube projecting from one side of the eduction chamber, so that the operator can observe the escape of the milk therefrom. The upper surface of the plug M' is preferably made conical or flaring outwardly to direct the milk toward the outer side of the eduction chamber.

O represents the upper head of the pump cylinder which is provided with perforations $o$, for admitting the air to the same.

P represents the piston arranged in the pump cylinder and provided with an upwardly projecting rod $p$, which is guided in the contracted neck of the upper head O, and provided above the same with a handle $p'$, by which the piston is worked. When the piston is in its lowest position, as represented in Fig. 4, it stands immediately above the induction passage $g$, and the handle $p'$ rests upon the neck of the upper head, whereby further downward movement of the piston is prevented.

Q represents a relief valve which opens into the pump cylinder below the piston and admits the external air to the same, if the rarefaction of the air below the piston is such that the external air pressure overcomes the pressure or load by which the relief valve is held to its seat. This relief valve permits the rarefaction of the air below the piston only to a certain limit, and when that limit is exceeded, the valve opens and admits the external air underneath the piston until the normal density has been restored, when the valve closes again. This relief valve serves in this manner to regulate the partial vacuum which can be produced by the pump, and, by adjusting the valve properly, only such a partial vacuum can be produced, as is necessary for the purposes of the machine and which will not injure the cow, thereby avoiding all danger from excessive suction.

As shown in Figs. 4, 5 and 6, the relief valve is applied to an opening in the piston and closes against the under side of said opening, while the stem $q$ of the valve extends upwardly through the opening and is surrounded by a spring $q'$, which rests upon a bridge in the opening and draws the valve upwardly against its seat. A screw nut $q^2$ is applied to the upper end of the valve stem and bears upon the spring. When the over pressure of the air above the piston overcomes the pressure of the spring against the valve, the valve opens and the air enters the space below the piston until the difference in pressure has been reduced to that point at which the spring again closes the valve. By adjusting the screw nut, the pressure which the spring exerts upon the valve can be increased or reduced thereby increasing or reducing the partial vacuum which can be produced below the piston. A variation of this partial vacuum is permissible within certain limits, and the operator can regulate it by adjusting the pressure of the spring. I have found that a partial vacuum of about five inches of mercury below the normal atmospheric pressure produces satisfactory results.

In order to facilitate this adjustment of the spring, and in order to prevent the valve from being loaded excessively, a stop arm R is provided which is attached to the upper end of the valve stem $q$, by a screw standard $r$, on which the inner end of the arm R rests, and to which it is secured by a screw $r'$, as represented in Fig. 6. This arm R is supported by the standard $r$ above the normal position of the screw nut $q^2$, and extends outwardly from the standard, then downwardly on the outer side of the screw nut, and then inwardly at its lower end below the screw nut, so that the upper and lower parts of this arm limit, respectively, the upward and downward movements of the screw nut. The downward movement of the screw nut compresses the spring and increases the load on the valve, and the lower part of the arm is so arranged that it stops the screw nut before the tension of the spring becomes excessive. The upward movement of the screw nut releases the spring and this movement of the screw nut is preferably limited by a set screw $r^2$, which works in the upper part of the arm R and bears against the upper part of the screw nut. The latter is provided with a circular row of depressions, in either of which the set screw can be engaged for locking the nut in position. These depressions are preferably numbered consecutively for the purpose of enabling the operator to more readily ascertain whether the screw nut is in the desired position.

The pump can be arranged to connect with two cows at the same time by providing two induction chambers G, as represented in Fig. 8, and connecting these chambers with the pump cylinder by pipes S, leading to a pipe S', which opens into the pump cylinder. The pipes S are provided with stop cocks $S^2$, so that one of these induction chambers can be cut off from communication with the pump cylinder, when only one induction chamber is to be used.

In my improved cow-milking machine, the suction is directly applied by the pump to the flexible tubes, which connect with the devices applied to the udder, and the employment of an air tight milk pail is thereby avoided, while the relief valve regulates the partial vacuum produced by the pump, and so renders the direct connection of the pump with the tubes practical, and avoids excessive suction. The suction is applied intermittently and therefore acts upon the teats in a natural way and the pump is easily operated.

Instead of arranging the relief valve in the piston, it may be arranged in the lower part of the pump cylinder, as represented in Fig. 7.

I claim as my invention—

1. In a cow milker, the combination with a suction pump, having appliances for connecting with the teats, induction and eduction valves, and a passage establishing a communication between the space below the piston and the external air, of an automatic relief valve controlling said passage and opening into the space below the piston, whereby the external air is admitted to the space below the piston when a pre-determined partial vacuum has been produced and excessive suction on the teat appliances is prevented, substantially as set forth.

2. The combination with a suction pump, of an automatic relief valve, means whereby the load on the valve can be adjusted, and a stop whereby the adjustment of the load is limited, substantially as set forth.

3. The combination with a suction pump, of a relief valve, a spring bearing upon the same, a screw nut whereby the spring is adjusted, and a stop whereby the tightening movement of the nut is limited, substantially as set forth.

4. The combination with the suction pump, of a relief valve, a spring bearing upon the same, a screw nut whereby the spring is adjusted, and a stop whereby the releasing movement of the nut is limited, substantially as set forth.

5. The combination with the suction pump, of a relief valve, a spring bearing upon the same, a screw nut whereby the spring is adjusted, and stops on both sides of the nut whereby the movement of the nut in either direction is limited, substantially as set forth.

Witness my hand this 17th day of January, 1893.

JENS SEVERIN JENSEN.

Witnesses:
JOHAN D. FREDERIKSEN,
EMIL L. G. TOBORG.